D. A. HELMICH.
SELF CLEANING ROTARY HARROW.
APPLICATION FILED DEC. 26, 1911.
1,045,024.
Patented Nov. 19, 1912.
2 SHEETS—SHEET 2.
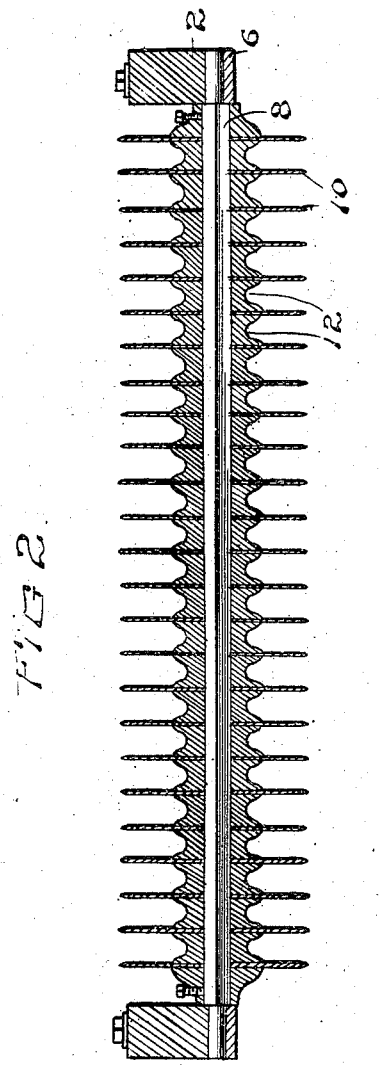
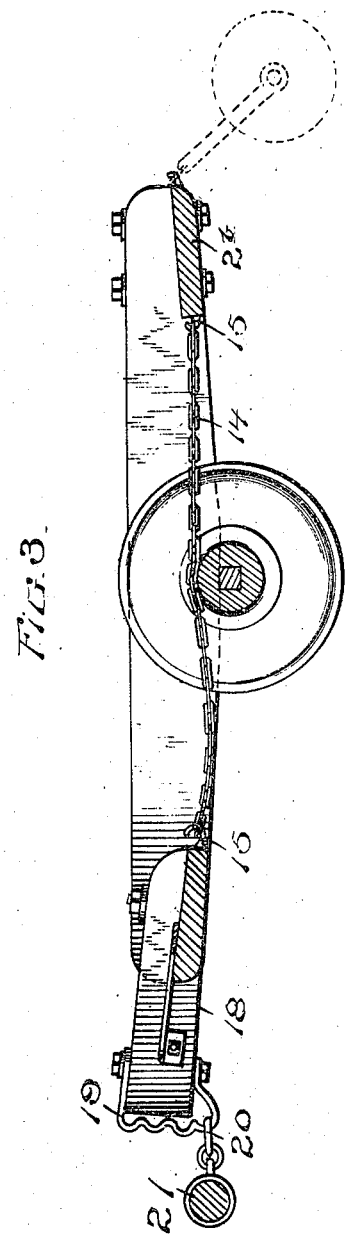

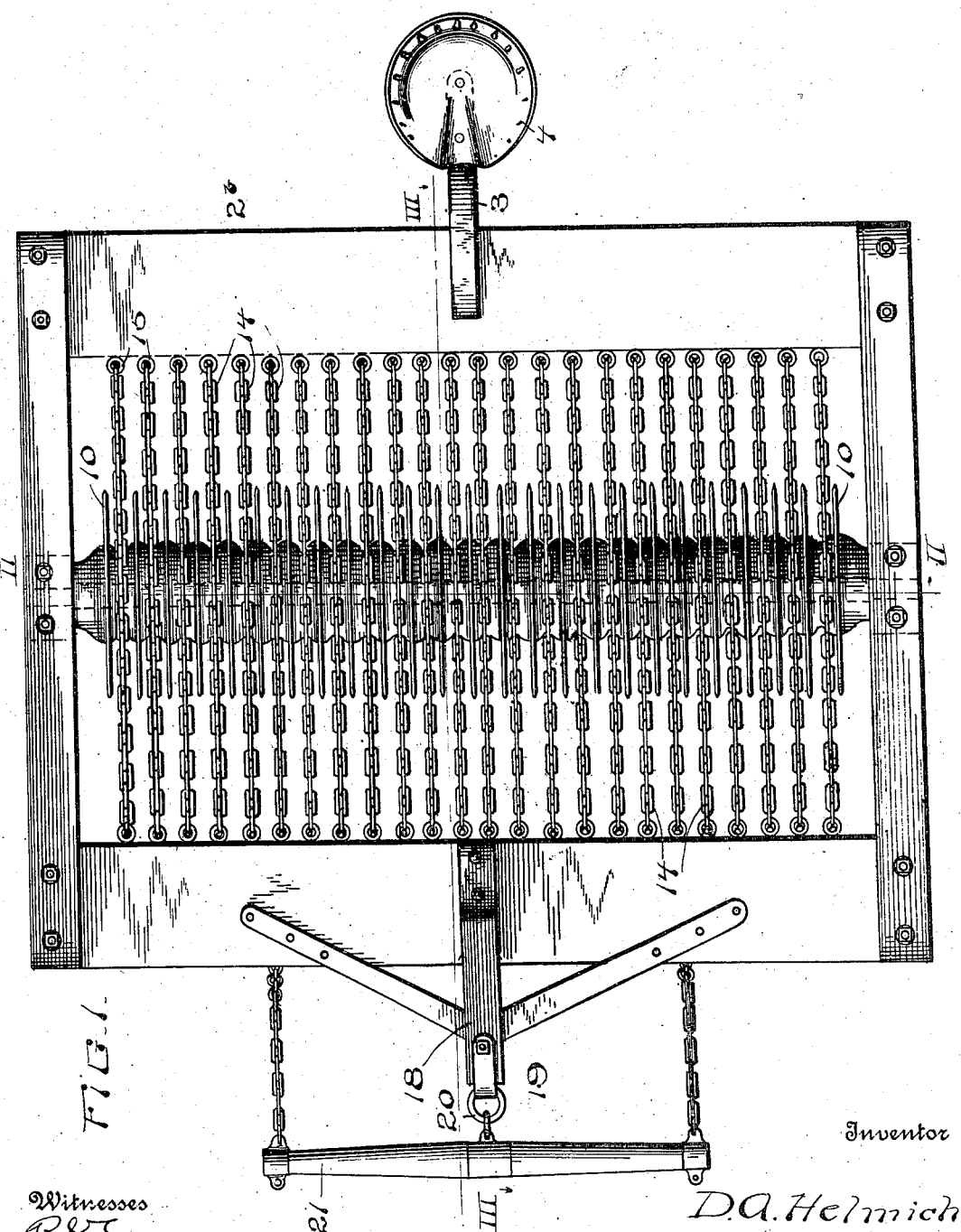

UNITED STATES PATENT OFFICE.

DANIEL A. HELMICH, OF BIRMINGHAM, ALABAMA.

SELF-CLEANING ROTARY HARROW.

1,045,024.  Specification of Letters Patent.  Patented Nov. 19, 1912.

Application filed December 26, 1911. Serial No. 667,859.

*To all whom it may concern:*

Be it known that I, DANIEL A. HELMICH, a citizen of the United States, residing at Birmingham, in the county of Jefferson and State of Alabama, have invented new and useful Improvements in Self-Cleaning Rotary Harrows, of which the following is a specification.

My invention relates to harrows of the rotary blade type, and the main object of my invention is to provide a harrow which will be self-cleaning so that it will not become clogged when working in damp or wet soil.

The ordinary rotary harrows having a single shaft are objectionable because they are liable to become clogged and become practically nothing more than rollers. Again, multiple shafts are objectionable because, if of sufficient weight, they cannot be turned at the end of a row. In single shaft rotary harrows it is necessary to place the cutters or disks close together, about two inches apart, so that they easily become clogged or choked. It has been proposed to use scrapers, such as rods, scraping blades, or loose rings which scrape against the sides of the disks or blades, but those are too rigid, causing a large amount of friction, and cannot adapt themselves to the varying conditions to which the harrow is subjected.

My present invention obviates the difficulties heretofore experienced, and provides a self-cleaning rotary harrow in which the cleaning devices are sufficiently flexible or yielding, and reduce the friction to a minimum, while at the same time effectually preventing the blades from becoming choked. For this purpose, I employ a series of chains which pass between the several blades and rest upon the spacers or spacing-disks and are allowed to hang somewhat loosely thereover in order to minimize friction.

This invention will be understood from the following description, in connection with the accompanying drawings, in which—

Figure 1 illustrates a top plan view of a rotary harrow embodying my invention; Fig. 2 is a vertical cross-section on the line II—II of Fig. 1; and Fig. 3 is a longitudinal section on the line III—III of Fig. 1.

The frame or body 2 is of the ordinary construction and is provided, as usual, with a seat-post 3 and seat 4 at the rear. The side frame-bars carry journal boxes 6, for the shaft 8, upon which are mounted the circular blades or cutters 10, separated by the spacers or spacing-disks 12, which are preferably grooved to form seats or guides for the cleaning chains 14. By referring to Fig. 3, it will be observed that the chains pass loosely over the disks and are held at either end by means of hooks 15, so that they may be readily unfastened in case it should become necessary, as, for instance, when there is unusual clogging by reason of rocks or other unyielding substances which may become wedged between adjacent disks. These chains, however, are especially advantageous when the ground is damp, as they effectually remove the wet, sticky earth which continually clings to the cutters or blades and is carried up between them.

In order that the frame 2 may be tilted to different vertical angles, I provide the forward end of the draft-beam 18, with a clevis 19, having a series of loops or corrugations by which the ring 20, of the swingle-tree 21, may be raised or lowered into different adjusted positions. When the ring 20 is in the lowest corrugation or socket, the forward end of the frame will be elevated and the rear end will be lowered so that the rear cross-beam $2^b$ will drag upon the ground and serve to cover seed that may have been sown broadcast. If desired, a roller may be attached to the rear beam, as indicated in dotted lines in Fig. 3.

The advantages of my self-cleaning harrow will be appreciated by agriculturists who have experienced the difficulties of harrowing ground which is moist or wet, in which condition it clings to the cutters or blades and rapidly clogs the machine, so that its efficiency is greatly impaired, and frequently destroyed. The chains in my harrow device obviate clogging, and as they hang loosely over the shaft, the friction is reduced to a minimum. Moreover, this construction allows the disks to be placed quite close together, at a distance of about two inches apart. While this machine is intended mainly as a harrow, yet it will be obvious to those familiar with the farming of corn and cotton, that it may also be used for cutting corn and cotton stalks and the like.

I have described in detail the construction illustrated in the accompanying drawings, for the purpose of disclosing an embodiment of my invention, but I am aware that changes may be made therein without departing from the spirit thereof.

I claim:—

1. A self-cleaning harrow, comprising a frame, a shaft journaled therein, a series of spaced cutters or blades carried by said shaft, and a series of chains secured at their opposite ends to the frame and passing across said shaft between adjacent blades.

2. A self-cleaning harrow, comprising a frame, a shaft mounted therein, a series of spaced cutters or blades carried by said shaft, and a series of chains detachably secured at their opposite ends to the frame and passing across said shaft between adjacent blades.

3. A self-cleaning harrow, comprising a frame, a shaft mounted therein, a series of spaced cutters or blades carried by said shaft, a series of chains secured at their opposite ends to the frame and passing across said shaft between adjacent blades, and a vertically adjustable draft-device.

4. A self-cleaning harrow, comprising a frame, a shaft mounted therein, a series of cutters or blades carried by said shaft, grooved spacing-disks alternately arranged with said blades upon said shaft, and a series of chains secured at opposite ends to the frame and passing across said shaft between adjacent blades, said chains being intermediately supported within the grooves of said spacing-disks.

In testimony whereof I have hereunto set my hand in presence of two subscribing witnesses.

DANIEL A. HELMICH.

Witnesses:
P. H. HARRIS,
R. B. TARPLEY.

---

Copies of this patent may be obtained for five cents each, by addressing the "Commissioner of Patents, Washington, D. C."